United States Patent

Holcombe et al.

[11] Patent Number: 5,252,267
[45] Date of Patent: Oct. 12, 1993

[54] PROCESS FOR MICROWAVE SINTERING BORON CARBIDE

[76] Inventors: Cressie E. Holcombe, 440 Sugarwood Dr., Knoxville, Tenn. 37922; Marvin S. Morrow, Rte. #3, Box 113, Kingston, Tenn. 37763

[21] Appl. No.: 33,931

[22] Filed: Mar. 18, 1993

[51] Int. Cl.$^5$ .............................................. C04B 35/56
[52] U.S. Cl. ........................................ 264/26; 264/25; 264/56
[58] Field of Search .............................. 264/25, 26, 56

[56] References Cited

U.S. PATENT DOCUMENTS 4,880,578  11/1989  Holcombe et al. .................... 264/26
5,164,130  11/1992  Holcombe et al. .................... 264/26

Primary Examiner—James Derrington

[57] ABSTRACT

A method of microwave sintering boron carbide comprises leaching boron carbide powder with an aqueous solution of nitric acid to form a leached boron carbide powder. The leached boron carbide powder is coated with a glassy carbon precursor to form a coated boron carbide powder. The coated boron carbide powder is consolidated in an enclosure of boron nitride particles coated with a layer of glassy carbon within a container for microwave heating to form an enclosed coated boron carbide powder. The enclosed coated boron carbide powder is sintered within the container for microwave heating with microwave energy.

6 Claims, No Drawings

PROCESS FOR MICROWAVE SINTERING BORON CARBIDE

This invention was made with Government support under contract DE-AC05-840R21400 awarded by the U.S. Department of Energy to Martin Marietta Energy Systems, Inc. and the Government has certain rights in this Invention.

FIELD OF THE INVENTION

The present invention relates to a method of sintering boron carbide, more particularly, to a method of microwave sintering of boron carbide.

BACKGROUND OF THE INVENTION

There has been a continual need for efficiently sintering nonoxide ceramics, particularly those that are suitable for high-hardness and high temperature applications, such as are required for drill and tool bits and for ceramic armor. Boron carbide is an excellent lightweight material for ceramic armor and high-wear applications. However, the material does not sinter well, requiring temperatures over 2200 C for densification with or without hot-pressing.

Microwave sintering of boron carbide at 2000° C. is described in a paper by J.D. Katz, R.D. Blake, J.J. Petrovic and H. Sheinberg, *Microwave Sintering of Boron Mat. Res. Soc. Symp. Proc.*, Vol. 124, pp 219-226, 1988.

Examples of methods for densifying boron carbide are described in U.S. Pat. No. 4,195,066 which describes the introduction of carbon additives necessary for pressureless sintering of boron carbide and U.S. Pat. No. 4,320,204 which describes the utilization of silicon carbide/aluminum composites.

OBJECTS OF THE INVENTION

Accordingly, it is an object of the present invention to provide a method of microwave sintering boron carbide powder.

Further and other objects of the present invention will become apparent from the description contained herein.

SUMMARY OF THE INVENTION

In accordance with one aspect of the present invention, a new and improved method of microwave sintering boron carbide comprises the following steps: Step 1—leaching boron carbide powder with an aqueous solution of nitric acid to form a leached boron carbide powder. Step 2—The leached boron carbide powder of Step I is coated with a glassy carbon precursor to form a coated boron carbide powder. Step 3—The coated boron carbide powder of Step 2. is consolidated in an enclosure of boron nitride particles coated with a layer of glassy carbon within a container for microwave heating to form an enclosed coated boron carbide powder. Step 4.—The enclosed coated boron carbide powder of Step 3 is sintered within the container for microwave heating with microwave energy.

DETAILED DESCRIPTION OF THE PREFERRED EMBODIMENTS

The densification of boron carbide usually requires temperatures of about 2100° C. However it has been shown that boron carbide powder can be microwave sintered to essentially full density below 2100° C. by using a powder pre-treatment involving a nitric acid leach. This powder pre-treatment should also be applicable to conventional non-microwave sintering (or hot-pressing—although the advantages of lowering the processing temperature are not so important if hot-pressing is used). It was discovered that when nitric-acid leached boron carbide powder is used to make boron carbide—2.5 wt.% carbon (with the carbon being derived from 8 wt.% furan resin) pellets for microwave-sintering in argon in a boron nitride pack, fully dense pellets result with the sintering temperature below 2000° C. To compare the properties of such material with un-leached boron carbide powder, identical pellets were prepared and microwave processed, yielding density of only 86%. These results show that the nitric acid treatment has activated the sintering of the boron carbide.

Several pre-treatments have been investigated for activating the sintering of boron carbide, including boiling in water and treating with gaseous hydrofluoric acid. The latter caused no improvement in either microwave sintering or hot-pressing. The water boiling treatment caused some improvement in sintering but not enough to achieve densities approaching 100% and also not allowing sintering temperatures to be lowered below 2000° C.

Typical analyses of boron carbide powders show that calcium is one of the prime impurities, probably present either as the oxide or boride. The calcium is the only impurity that would not have been reduced by the gaseous hydrofluoric treatment, and indeed, calcium was detected by ESCA (electron spectroscopy for chemical analyses) of hydrofluoric acid-treated boron carbide. Calcium, present as oxide or boride, however, would be expected to be reduced considerably by the nitric acid leach. In any case, the leach greatly enhanced sinterability.

Other acids may be usable for the leaching step. However, nitric is still expected to be the best. Sulfuric acid can lead to residual sulfates that do not dissociate until temperatures reach the 2000° C. mark. Likewise, hydrochloric acid can lead to remnants that are not easily evolved until extreme temperatures are reached. Other acids would be expected to be too weak to adequately remove calcium, if indeed that is the culprit that inhibits the sinterability of the boron carbide and is removed by the nitric acid leach.

The leach procedure is: A 1:1 volume mixture of water to concentrated nitric acid is used in large excess to cover a batch of boron carbide powder. The acid is allowed to contact the powder for several hours to a day or so at room temperature. Then the "skum" on the surface is removed from the leaching container. The powder is rinsed and filtered out of the liquid, dried, and then coated with a glassy carbon precursor, furan resin. Furan resin is a crosslinkable aromatic polymer. Other crosslinkable aromatic polymers such as polyphenylenes, polyimides, aromatic epoxy formulations, or phenolic resins can be used as a glassy carbon precursor. 8 wt.% furan resin is added in an acetone slurry to the boron carbide. The powder is then heated in argon or in a vacuum to 1000° C to dissociate the furan resin and yield approximately 2.5 wt.% noncrystalline carbon, glassy carbon. This powder is then pressed into a pellet, typically using unidirectional pressing at 5,000 to 10,000 psi.

The pellet Was heated in argon to 1900-1950° C. in 20-30 minutes using 2.45 GHz microwave radiation and held at that temperature for 5-10 minutes, yielding a fully dense pellet. A comparable sintering of an unleached boron carbide powder did not sinter to full density. This comparison confirmed that the nitric leach was essential in obtaining a fully dense boron carbide article by microwave heating to a temperature significantly less than 2000° C.

It was noted that the fully dense pellet produced was easier to cut with a diamond saw than other high-density pellets of similar composition. This is an additional advantage since easier machining of the densified boron carbide material is desirable by reducing the cost of machining boron carbide materials. It is possible that the improved densification could have resulted from the combination of the nitric leach and microwave interaction with the surface activated particles. Thus, the leach effect may not be as great with conventional sintering or hot pressing of the material.

Boron carbide is a useful lightweight, hard, abrasive material. A particular problem in the widespread use of boron carbide for ceramic armor, for example, has been the need to use hot-pressing to obtain the necessary densification. Hot pressing is a very expensive and tedious process. In contrast, the method of the present invention has a decided advantage over the hot pressing process. Being able to sinter below 2000° C. utilizing microwave energy is less expensive, requires less energy and less time to obtain a densified boron nitride article as compared to a hot pressing procedure.

The potential for general use in all the high purity boron carbide processing areas is very high, since this new activated-sinterable powder leads to full density with microwave processing temperatures below 2000° C.—very easy to handle compared to the 2100-2200° C. normally needed to densify the material by conventional sintering or hot-pressing.

We have found no references in the literature to enhance the sintering of boron carbide powder by a leaching treatment that allows the material to density at lower-than-normal sintering temperatures. Also, we have found no reference describing the use of microwave sintering of boron carbide to fully densify at temperatures below 2000° C.

While there has been shown and described what is at present considered the preferred embodiments of the invention, it will be obvious to those skilled in the art that various changes and modifications may be made therein without departing from the scope of the invention as defined by the appended claims.

What is claimed is:

1. A method of microwave sintering boron carbide comprising the following steps:
   Step 1—leaching boron carbide powder with an aqueous solution of nitric acid to form a leached boron carbide powder;
   Step 2—coating said leached boron carbide powder of Step 1 with a glassy carbon precursor to form a coated boron carbide powder;
   Step 3—consolidating said coated boron carbide powder of Step 2 to form a consolidated powder and enclosing said consolidated powder in an enclosure of boron nitride particles coated with a of glassy carbon within a container for microwave heating to form consolidated and an enclosed coated boron carbide powder; and
   Step 4—sintering said consolidated and enclosed coated boron carbide powder within said container for microwave heating with microwave energy.

2. A method of microwave sintering boron carbide in accordance with claim 1 wherein said sintering in Step 4 is at a temperature less that 2000° C.

3. A method of microwave sintering boron carbide in accordance with claim 1 wherein said sintering in Step 4 is at a temperature of about 1900 to about 1950° C.

4. A method of microwave sintering boron carbide in accordance with claim 1 wherein said microwave energy in Step 4 is at 2.45 GHz.

5. A method of microwave sintering boron carbide in accordance with claim 1 wherein said consolidating of Step 3 comprises unidirectional pressing at about 5,000 to about 10,000 psi.

6. A method of microwave sintering boron carbide in accordance with claim wherein said glassy carbon precursor comprises a crosslinkable aromatic polymers selected from the group consisting of polyphenylenes, polyimides, aromatic epoxy formulations, phenolic resins, furan resins, and combination thereof.

* * * * *

UNITED STATES PATENT AND TRADEMARK OFFICE
CERTIFICATE OF CORRECTION

PATENT NO. : 5,252,267
DATED      : October 12, 1993
INVENTOR(S): Cressie E. Holcombe et al It is certified that error appears in the above-indentified patent and that said Letters Patent is hereby corrected as shown below:

On the title page:

-- [73] Assignee: Martin Marietta Energy Systems, Inc.,
            Oak Ridge, TN--.

Signed and Sealed this

Thirty-first Day of May, 1994

Attest:

BRUCE LEHMAN

*Attesting Officer*          *Commissioner of Patents and Trademarks*